US006987530B2

(12) United States Patent
McConica

(10) Patent No.: US 6,987,530 B2
(45) Date of Patent: Jan. 17, 2006

(54) METHOD FOR REDUCING MOTION BLUR IN A DIGITAL IMAGE

(75) Inventor: Charles H McConica, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/867,352

(22) Filed: May 29, 2001

(65) Prior Publication Data

US 2003/0011717 A1 Jan. 16, 2003

(51) Int. Cl.
*H04N 5/228* (2006.01)
*G06K 9/00* (2006.01)

(52) U.S. Cl. .............................. 348/208.6; 348/208.13; 382/107

(58) Field of Classification Search ............. 348/208.6, 348/208.4, 208.5, 208.99, 208.1, 208.13, 348/208.16, 218.1, 219.1, 699; 396/52, 54, 396/55; 382/101, 243, 255, 276, 265, 280, 382/283, 266, 107
See application file for complete search history.

(56) References Cited

U.S. PATENT DOCUMENTS 3,627,920 A * 12/1971 Schroeder et al. .......... 382/112
5,109,425 A * 4/1992 Lawton ...................... 382/107
5,172,233 A * 12/1992 Yoshihara et al. ........ 348/208.1
6,100,927 A * 8/2000 Ogino .................... 348/208.14
6,172,707 B1 * 1/2001 Ouchi et al. ............. 348/208.6
2001/0042825 A1 * 11/2001 Young ..................... 250/252.1

FOREIGN PATENT DOCUMENTS

JP          11284944 A    * 10/1999

OTHER PUBLICATIONS

Greenspan et al. , Image Enhancement By Nonlinear Extrapolation in Frequency Space, Jun. 6, 2000, IEEE Transactions On Image Procesing, vol. 9. 1035–1047.*

Arthur R. Weeks, Jr., "Fundamentals of Electronic Image Processing", The International Society for Optical Engineering Bellingham, Washington USA and The Institute of Electrical and Electronics Engineers, Inc., New York, 1996, pp. 121–172.

* cited by examiner

*Primary Examiner*—Thai Tran
*Assistant Examiner*—Lin Ye

(57) ABSTRACT

Method and apparatus for detecting and reducing motion blur caused by the movement between a camera and an object including calculation of first and second figures of merit associated with two substantially orthogonal directions and comparison of the figures of merit and adjustment of the magnitude of the amplitude of spatial frequencies of the image in response to the comparison.

24 Claims, 8 Drawing Sheets

METHOD FOR REDUCING MOTION BLUR IN A DIGITAL IMAGE

TECHNICAL FIELD OF THE INVENTION

The present invention relates to reducing motion blur in a digital image and, more particularly, to analyzing image data representative of a digital image to determine the amount and direction of motion blur and processing the image data to reduce the motion blur.

BACKGROUND OF THE INVENTION

Digital still cameras generate image data representative of an image of an object. The process of generating image data representative of an image of an object is often referred to simply as "imaging" or "capturing" the object. The image data is processed and output to a device that displays a replicated image of the object. For example, the replicated image of the object may be displayed on a video monitor or printed by a printer.

The digital camera focuses the image of the object onto a two-dimensional array of photodetecting elements. The photodetecting elements are relatively small and each one generates image data representative of a very small portion of the image of the object. For example, the two-dimensional array may have several million photodetecting elements that each generate image data representative of a small portion of the image of the object. The image data generated by the individual photodetecting elements is processed to recreate the image of the object. One type of photodetecting element is a charge-coupled device that outputs a voltage that is proportional to the amount of light it receives over a preselected period.

In order to improve the image generated by a digital camera, the density of photodetecting elements on the two-dimensional array is increased. The increased density of photodetecting elements increases the number of photodetecting elements that image an object, which in turn improves the quality of the image by reducing spaces between imaged portions of the object. Another method of improving the image generated by a digital camera, especially in low light conditions, is by using a long period to generate the image data. This long period of image generation is achieved by having the photodetecting elements detect light for an extended period.

One problem with photography, including digital photography, is that the image generated by the camera will be blurred if the camera moves as the photodetecting elements generate image data. For example, under ideal conditions of no movement in the digital camera relative to the object being imaged, each photodetecting element generates image data representative of a particular portion of the image of the object. If, however, the camera is moved as the image data is generated, the individual portions of the image of the object will be imaged by several photodetecting elements. Accordingly, each photodetecting element images several different portions of the image of the object, which causes the replicated image of the object to be blurred. This type of blur is referred to as motion blur.

The motion blur problem is exacerbated as the above-described imaging period is extended. The extended imaging period results in a higher probability that the camera will be moved during the imaging period, which results in a higher probability that motion blur will occur in the replicated image. Accordingly, the benefit of an extended imaging period may be offset by a higher probability of generating a blurred image. The problem of motion blur is further exacerbated by the use of more photodetecting elements to generate an image. The photodetecting elements will be smaller and receive less light. Accordingly, the exposure time of the camera must be extended in order for the smaller photodetecting elements to receive enough light to generate accurate image data.

Therefore, a need exists for a method and device for detecting and reducing motion blur in a digital image.

SUMMARY OF THE INVENTION

The present invention is directed toward minimizing motion blur in a replicated image of an object. The image of the object is represented in the form of image data. The image data may, as an example, be generated by photographing the object using a digital camera, which generates image data representative of the object. The image data may be a plurality of values corresponding to the intensity of light generated at small portions or pixel locations within the image of the object.

The image data is analyzed to determine if the magnitude of the amplitude at a specific spatial frequency in one direction is less than the magnitude of the amplitude at the specific spatial frequency in other directions, which is indicative of motion blur. This may be generalized to multiple specific spatial frequencies by comparing the amplitude at each specific spatial frequency for the various directions.

The magnitude of the amplitude of a specific spatial frequency is proportional to a figure of merit. A first figure of merit is calculated in a first direction and a second figure of merit is calculated in a second direction, wherein the second direction is substantially perpendicular to the first direction. If motion blur exists with respect to either the first direction or the second direction, the figure of merit in one direction will be smaller than the figure of merit in the other perpendicular direction. The magnitude of the ratio of the first figure of merit to the second figure of merit is compared to a preselected value to determine if the value of the first figure of merit is significantly different from the value of the second figure of merit. If the magnitude of the ratio is greater than the preselected value, motion blur exists. The direction of the motion blur is in the direction corresponding to the lesser of the two figures of merit values.

Motion blur is minimized by increasing the magnitude of the amplitude of the signals in the appropriate set of spatial frequencies of the image in the direction of the motion blur. The appropriate set of spatial frequencies are dependent on the image characteristics. In one embodiment, the spatial representation of image data may be improved in the direction of the motion blur by applying a deconvolution or modified deconvolution correction to the frequency domain representation of the image data. The frequency domain representation of the image data may then be converted back to the spatial representation of the image data. This conversion may, as an example, be accomplished by application of kernel operators in the spatial domain during a demosaicing operation. These operations may be accomplished by factory preselected correction factors, by image dependent correction factors, or by manually chosen correction factors.

DETAILED DESCRIPTION OF THE INVENTION

A method and apparatus for detecting and reducing motion blur in an image is generally described below followed by a more detailed description.

FIGS. 1 through 8, in general, illustrate a method for detecting motion blur in a digital image. The method may comprise providing image data representative of the digital image. The image data is analyzed to calculate a first figure of merit of the digital image in a first direction (X) and a second figure of merit of the digital image in a second direction (Y), wherein the first and the second directions are substantially orthogonal. A first ratio of the first figure of merit to the second figure of merit is calculated, wherein the ratio is the greater of the first or second figure of merit is divided by the lesser of the first or second figure of merit. The first ratio is compared to a preselected value, wherein motion blur exists in the digital image if the first ratio is greater than the preselected value.

FIGS. 1 through 8 also, in general, illustrate a method for reducing motion blur in an image. The method may comprise providing image data representative of the image. The image data is analyzed to detect the presence of motion blur in the image. The image data is further analyzed to detect the direction of motion blur in the digital image. The image data is then processed to increase edge acuity the image in the direction of the motion blur.

FIGS. 1 through 8 also, in general, illustrate an apparatus for detecting motion blur in an image. The apparatus may comprise a computer and a computer-readable medium operatively associated with the computer, wherein the computer-readable medium contains instructions for controlling the computer to detecting motion blur in an image by the method described below. The apparatus receives image data representative of the image. A first figure of merit of the image data is calculated in a first direction (X). A second figure of merit of the image data is calculated in a second direction (Y), wherein the first and the second directions (X, Y) are substantially orthogonal. A first ratio of the first figure of merit to the second figure of merit is calculated. The first ratio is the greater of the first or the second figure of merit divided by the lesser of the first or the second figure of merit. The first ratio is compared to a preselected value, wherein motion blur exists in the digital image if the first ratio is greater than the preselected value. The direction of motion blur corresponds to the lesser of the figures of merit.

Having generally described the digital camera 100 and a method for reducing blur in a digital image, they will now be described in greater detail. The following description focuses on the operation of the camera 100 followed by detection and reduction of motion blur in images generated by the camera 100.

Figure 1:
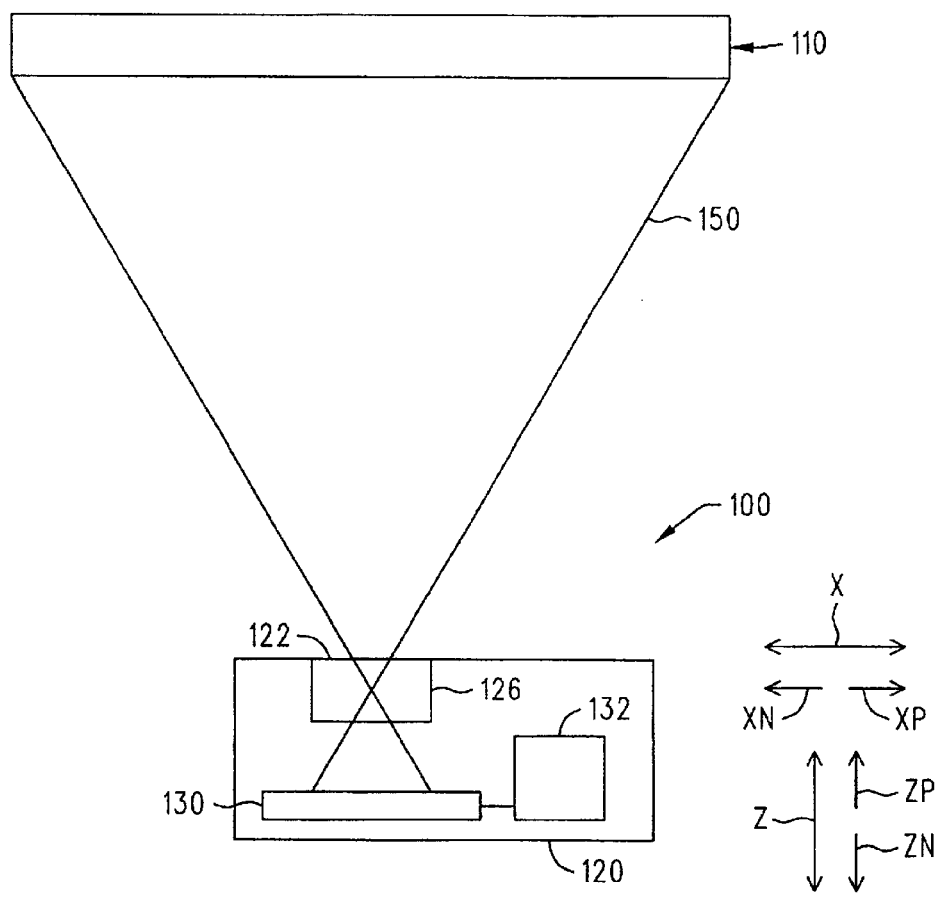
FIG. 1 is a schematic illustration of a digital camera imaging an object.

A schematic illustration of a digital camera 100 generating image data representative of an object 110 is illustrated in FIG. 1. The process of generating image data representative of an object is sometimes referred to simply as imaging or capturing the object. An x-direction X and a z-direction Z are used for reference purposes with regard to the camera 100 and the object 110 shown in FIG. 1. The x-direction X is described in greater detail with reference to a positive x-direction XP and a negative x-direction XN. Likewise, the z-direction Z is described in greater detail with reference to a positive z-direction ZP and a negative z-direction ZN A y-direction, not shown in FIG. 1, extends perpendicular to both the x-direction X and the z-direction Z and is described below.

The camera 100 may have a housing 120 with an aperture 122 formed therein. A lens 126 or a plurality of lenses may be located within or adjacent the aperture 122 and may serve to focus an image of the object 110 onto components located within the camera as is described below. The lens 126 may, as a non-limiting example, have a focal length of approximately seven millimeters. A two-dimensional photosensor array 130 and a processor 132 may also be located within the housing 120. As illustrated in FIG. 1, the image of the object 110 is focused onto the two-dimensional photosensor array 130 by the lens 126. It should be noted that the view of the two-dimensional photosensor array 130 illustrated in FIG. 1 is a side view. The processor 132 may be electrically connected to the two-dimensional photosensor array 130 and may serve to process data generated by the two-dimensional photosensor array 130 as is described in greater detail below.

Figure 2:
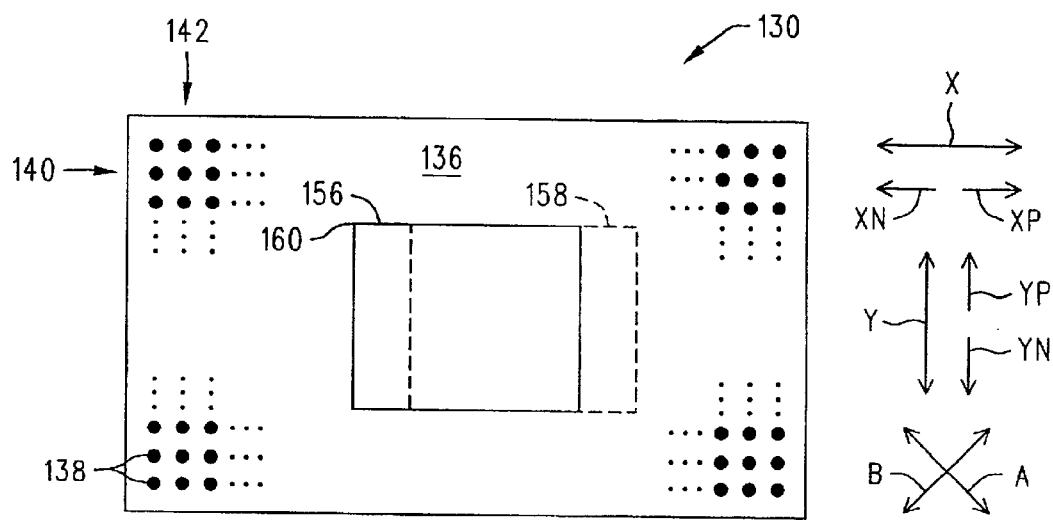
FIG. 2 is a front, enlarged view of a two-dimensional photosensor array used within the digital camera of FIG. 1.
Figure 3:
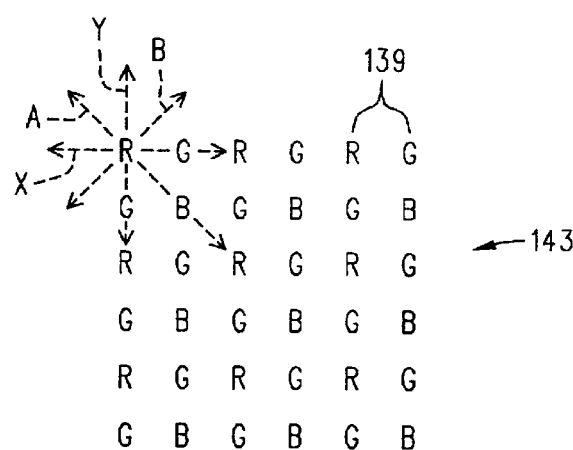
FIG. 3 is a color filter array using the Bayer pattern.
Figure 4A:
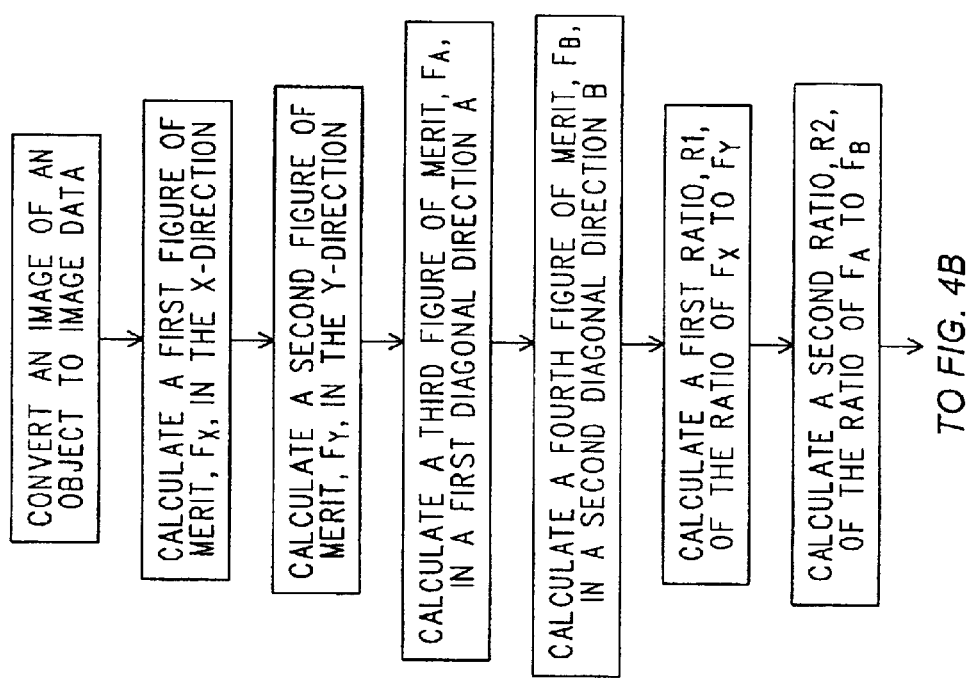
FIGS. 4A and 4B are a flowchart depicting a method of detecting and minimizing motion blur.
Figure 4B:
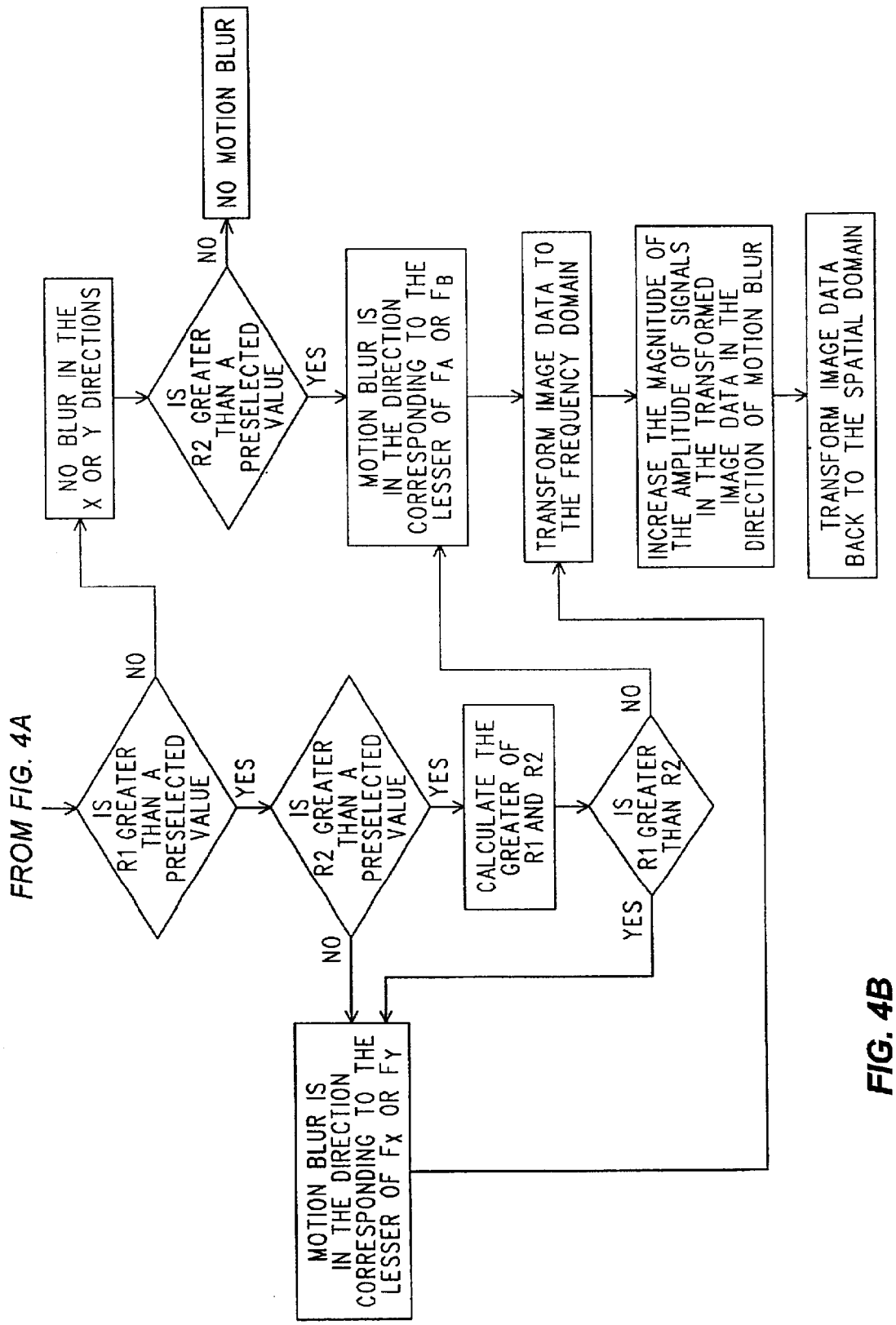

A front, enlarged view of the two-dimensional photosensor array 130 is illustrated in FIG. 2. The two-dimensional photosensor array 130 may have a surface 136 to which a plurality of photodetecting elements 138 are mounted. It should be noted that the photodetecting elements illustrated in FIG. 2 have been greatly enlarged for illustration purposes. The photodetecting elements 138 may be arranged so as to form a plurality of rows 140 and columns 142. Each of the photdetecting elements 138 may be adapted to generate image data representative of the intensity of a specific frequency band of light. For example, with additional reference to FIG. 3, a color filter array 143 may be attached to the surface 136 of the two-dimensional photosensor array 130 to filter the light before the light reaches the photodetecting elements 138. Accordingly, each photodetecting element 138 may receive light having a specific and narrow band of wavelengths. The color filter array 143 shown in FIG. 3 illustrates the Bayer patter, wherein R, G, and B represent color filters that allow specific bands of red, green and blue light to pass to the photodetecting elements 138. Accordingly, each of the red, green, and blue filters shown in FIG. 3 are associated with single photodetecting elements 138. It should be noted that the Bayer pattern has twice as many green filters as red and blue. The increased number of green filters compensates for human vision that is more sensitive to green light that red or blue light. It should also be noted that the color filter array 143 may have filters arranged in patterns other than the Bayer patter shown in FIG. 3.

The photodetecting elements 138 may be charge-coupled devices that develop a charge that is proportional to the amount of light they receive during a preselected period. The preselected period is dependent on the intensity of light to which the object 110, FIG. 1, is exposed and, thus, the intensity of light 150 that reflects from the object 110. For example, when an image is generated in a relatively dark environment, the preselected period is increased to enhance the generated image. Likewise, when an image is generated in a relatively bright environment, the preselected period is decreased.

Referring to FIGS. 1 and 2, in the embodiment of the camera 100 described herein, the lens 126 causes a blur of the image of the object 110 onto the photodetecting elements 138. The blur in the embodiment described herein is equal to approximately two photodetecting elements 138 and serves to prevent aliasing of the image during processing.

Referring again to FIG. 1, as described above, the processor 132 may be electrically connected to the two-dimensional photosensor array 130. The processor 132 receives and processes image data generated by the two-dimensional photosensor array 130. For example, the processor 132 processes information generated by the individual photodetecting elements 138 to "demosaic" the image and to properly combine the colors as described in greater detail below. Some examples of the functions performed by the processor 132 are described in the U.S. patent application Ser. No. 09/177,729 for IMAGE DEMOSAICING AND ENHANCEMENT SYSTEM of Taubman, filed on Oct. 23, 1998, which is hereby incorporated by reference for all that is disclosed therein. It should be noted that the processor 132 described herein has the additional ability to detect and minimize motion blur in an image.

The processor 132 may also be electrically connected to a peripheral viewing device, not shown, such as a computer monitor or a printer that serves to display and/or process the image data generated by the camera 100. The processor 132 may also be electrically connected to a peripheral computer, not shown, that stores and/or processes the image data generated by the two-dimensional photosensor array 130 and, thus, the camera 100. It should be noted that the processing techniques and methods described herein with reference to the processor 132 may be performed by the peripheral viewing device or computer. For example, image data generated by the two-dimensional photosensor array 130 may be transmitted directly to a peripheral processor for processing.

Having described the components of the camera 100 that are essential for the correction of motion blur, the operation of the camera 100 will now be described followed by a description of the camera 100 correcting for motion blur.

The camera 100 is typically held by a user and used to generate image data representative of an object, such as the object 110. The image data typically represents a still picture of the object 110, however, the image data may represent a moving picture, e.g., a motion picture, of the object 110. Light 150 reflects from the object 110 and enters the housing 120 of the camera 100 via the aperture 122. The lens 126 then focuses an image of the object 110 onto the two-dimensional photosensor array 130. The two-dimensional photosensor array 130 generates image data representative of the image of the object 110, which is output to the processor 132 for processing. As described above, in the embodiment of the camera 100 described herein, the lens 126 blurs the image focused onto the two-dimensional photosensor array 130 by two photodetecting elements 138, FIG. 2.

FIG. 2 illustrates an example of an image 156 of the object 110, FIG. 1, focused onto the two-dimensional photosensor array 130. When the image 156 is properly focused onto the two-dimensional photosensor array 130, an instruction is transmitted to the two-dimensional photosensor array 130, which causes the photodetecting elements 138 to generate image data. More specifically, the photodetecting elements 138 develop electrical charges that are dependent on the amount of light they receive over a preselected period that is reflected from the object 110. When the camera 100, FIG. 1, is used in dark environments, the preselected period is relatively long and when the camera 100 is used in bright environments, the preselected period is relatively short.

Referring to FIGS. 2 and 3, the image data may be processed as a plurality of individual color planes. For example, the image data may have a green plane, a red plane, and a blue plane. Alternatively, the green plane may be processed as two green planes because there are twice as many green photodetecting elements 138 as red or blue photodetecting elements 138. The green plane consists of image data generated by photodetecting elements 138 having a green color filter of the color filter array 143 associated with them. Likewise, the red and blue planes consist of image data generated by photodetecting elements 138 having red and blue color filters of the color filter array 143 respectively associated with them. These color planes allow for each color component of the composite image data to be processed individually. For example, individual colors may be scaled to increase or decrease their relative intensity. Likewise, image data from individual photodetecting elements 138 may be scaled accordingly.

The color filter array 143 provides a reference for directions used herein, including the directions of motion blur. A y-direction Y extends perpendicular to the x-direction X that was described above. An a-direction A extends diagonally to the x-direction X and the y-direction Y. A b-direction B extends perpendicular to the a-direction A. The aforementioned directions provide non-limiting examples of blur motion and correction as will be described in greater detail below.

Referring again to FIG. 1, under ideal circumstances, both the camera 100 and the object 110 remain stationary relative to each other during the above-described preselected period in which the two-dimensional photosensor array 130 generates image data. Ideal circumstances, however, are rarely achieved and the camera 100 generally moves somewhat relative to the object 110 while image data is being generated. For example, a user typically is unable to maintain the camera 100 in a fixed position relative to the object 110 while image data is being generated.

Motion blur is typically attributed to either rotational or translational movement of the camera 100 relative to the object 110 occurring as the object 110 is being imaged. The motion blur correction methods described herein are directed toward correcting motion blur caused by translational motion between the object 110 and the camera 100 as the object 100 is being imaged. It should be noted, however, that motion blur caused by rotational motion may also be corrected by the methods described herein. For example, if the center of relative motion between the camera 100 and the object 110 is a significant distance from the image area, the motion blur associated with the image may be substantially similar to motion blur caused by translational motion. One test to determine if motion blur attributed to rotational motion can be corrected as though it is attributed to translational motion is my measuring the blur on the image closest to the center of rotation and furthest from the center of rotation. If the two blurs are substantially equivalent, the motion blur may be corrected as though it is the result of translational motion. In one embodiment of the methods described herein, the blurs at the edges of the image are measured to determine if they are substantially equivalent, meaning that the blur is the result of translational motion.

Having summarily described the operation of the camera 100, the operation of the camera 100 will now be described generating image data that is blurred. In the example illustrated herein, the camera 100 has moved in the x-direction X as the image data was being generated. The movement in the x-direction X is an amount that causes the image 156 to move a distance of two and one-half photodetecting elements 138.

The movement of the camera 100 relative to the object 110 as the two-dimensional photosensor array 130 generates image data results in the image of the object 110 being blurred. More specifically, when the image data is processed using conventional processing methods, the replicated image of the object 110 will be blurred. An example of this blurring is illustrated in FIG. 2. The image 156 of the object 110, FIG. 1, is shown focused onto the two-dimensional photosensor array 130 at the commencement of the generation of the image data. As the generation of the image data by the photodetecting elements 138 proceeds, the image 156 focused onto the two-dimensional photosensor array 130 moves in the negative x-direction XN. By the time the photodetecting elements 138 have ceased generating image data, the image 156 has moved to a different location on the two-dimensional photosensor array 130. The location of the image of the object 110, FIG. 1, at the termination of the generation of image data is referenced as the second image 158 and is illustrated by dashed lines of FIG. 2. In the example cited herein, the image 156 has moved a distance that is represented by two and one-half columns 142 in the negative x-direction XN during the generation of the image data. The distance that the image 156 moved is proportional to the amplitude of the motion blur. The direction that the image 156 moved is referred to as the direction of the motion blur.

As described in greater detail below, image data is analyzed to determine the direction and amplitude of the blur. The amplitude is the amount of movement that occurred during the generation of the image data. The direction of motion blur as described herein is, for illustration purposes only, limited to the x-direction X, the y-direction Y, the a-direction A and the b-direction B. It should be noted that the motion blur detection and correction methods described herein are applicable to a plurality of amplitudes and directions.

Referring again to FIG. 1, the image data generated by the two-dimensional photosensor array 130 is transmitted to the processor 132 for processing. The processor 132 correlates the image data generated by each of the photodetecting elements 138, FIG. 2, with its associated color filter per the color filter array 143 of FIG. 3. For processing purposes, the image data may be sorted into the three color groups or planes described above, which are the red plane, the green plane, and the blue plane. Alternatively, the image data may be sorted into four groups if two green color planes are considered.

The processor 132 may store a numeric value corresponding to the image data values, or simply image data, generated by each of the photodetecting elements 138. The image data generated by each of the photodetecting elements 138 is proportional to the intensity of light received by each of the photodetecting elements 138. The processor 132 may also store the location from where each value of the image data was generated on the two-dimensional photosensor array 130.

Having described the generation of image data, the detection and reduction of motion blur will now be described. The following procedure is outlined in the flowchart of FIGS. 4A and 4B.

Image data generated by the two-dimensional photosensor array 130 is representative of the amplitude of light at a plurality of spatial locations within the area of the image. In the situation where the image data is representative of a color image, the image data is representative of the amplitude of light at a plurality of spatial locations for a plurality of color planes. For example, the image data may be represented in three color planes, a red plane, a green plane, and a blue plane. The image data of each color plane may be transformed to a frequency domain by application of a Fourier transform and is sometimes referred to as the "transformed" image data. The transformed image data represents an amplitude and a phase for each of a set of spatial frequencies.

The transformed image data offers a perspective on the image data relating to the amplitude and direction of blur within the image. The transformed image data may be manipulated as described below to reduce motion blur. The image data may then be retransformed by way of an inverse Fourier transform to its original format for presentation to a user. The motion blur in the retransformed image data has been reduced by the manipulation.

Motion blur reduces the amplitude of the transformed image data, especially in the higher spatial frequencies and always in the direction of the blur motion. When the image data is transformed into the frequency domain using a Fourier transform or the like, the magnitude of the amplitude of sinusoidal signals throughout the set of spatial frequencies in a direction perpendicular to the direction of the motion remains virtually unaffected. The same occurs with regard to directions that are close to perpendicular to the direction of the motion.

Having summarized motion blur, its detection and minimization will now be described in greater detail.

Figure 5A:
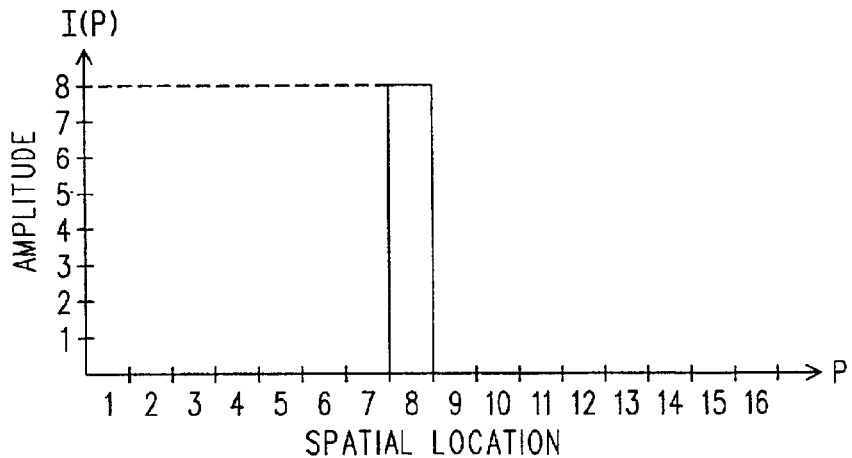
FIG. 5A is a graph representative of photodetecting element outputs detecting a single point of light without the presence of a blur filter in the camera.
Figure 5B:
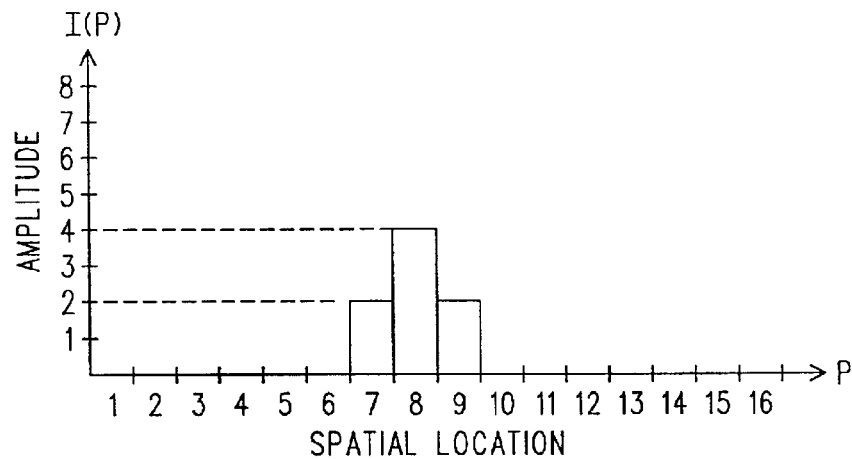
FIG. 5B is a graph representative of photodetecting element outputs of the point of light of FIG. 5A with the addition of a blur filter.
Figure 5C:
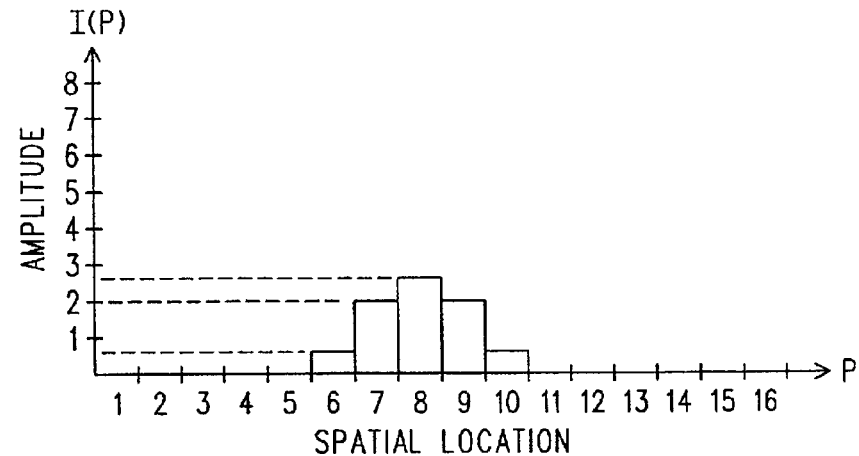
FIG. 5C is a graph representative of photodetecting element outputs of the point of light of FIG. 5A with the addition of a blur filter and motion blur.
Figure 6A:
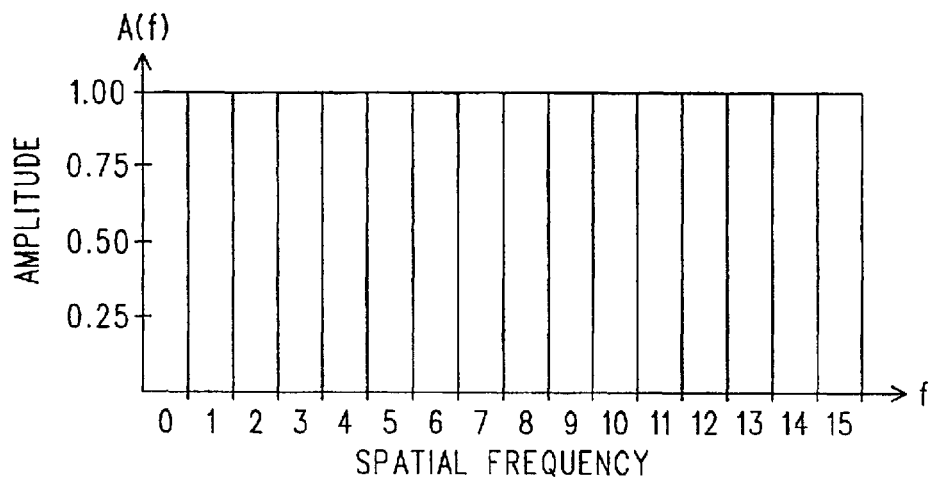
FIG. 6A is a graph showing the discrete spatial frequency representation of the graph of FIG. 5A.
Figure 6B:
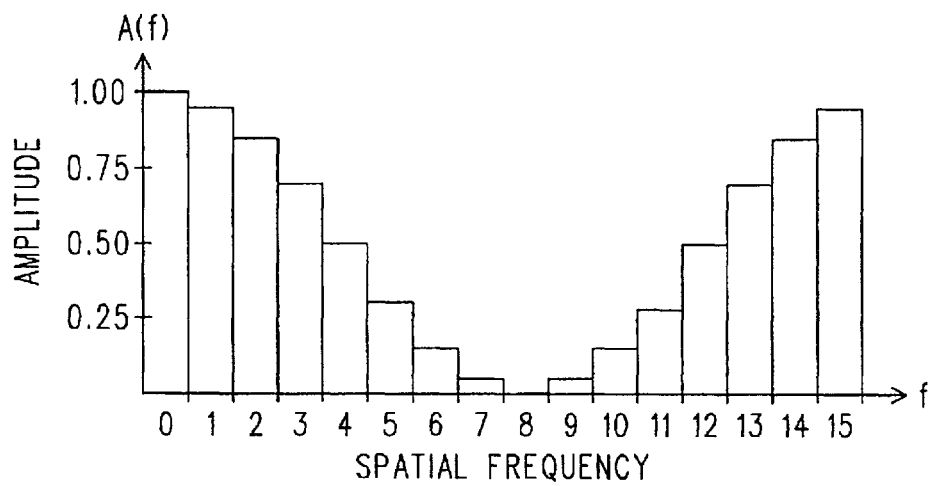
FIG. 6B is a graph showing the discrete spatial frequency representation of the graph of FIG. 5B.
Figure 6C:
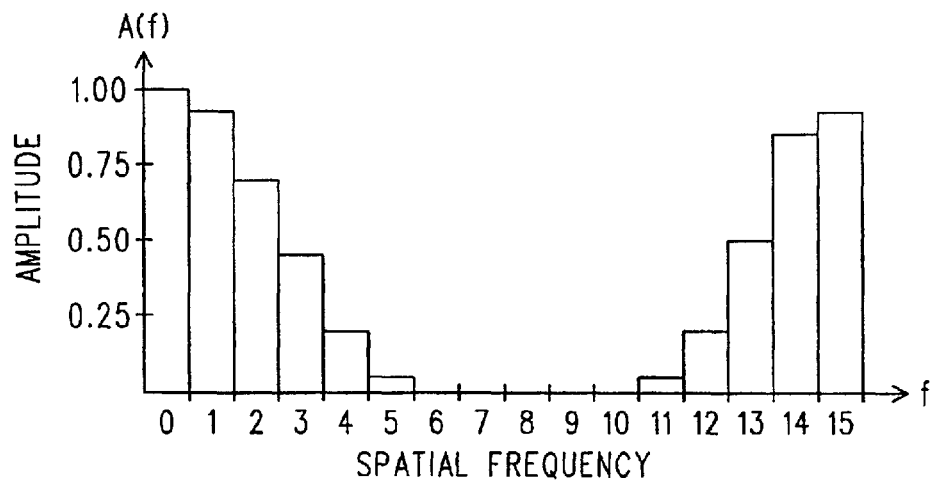
FIG. 6C is a graph showing the discrete spatial frequency representation of the graph of FIG. 5C.

An example of the spatial affects of motion blur are shown in the graphs of FIGS. 5A through 5C. The graphs 5A through 5C are, for illustration purposes, based on a linear view of the two-dimensional photosensor array 130 rather than a planar view of the two-dimensional photosensor array 130. The horizontal axes P in the graphs 5A through 5C represent spatial locations, and more particularly photodetecting element locations or pixel locations, from where image data was generated. Accordingly, the horizontal axes correspond to the locations of the photodetecting elements 138 of FIG. 2. The vertical axes I(P) represent the intensity of light received at the photodetecting element locations, which are values or magnitudes of the image data generated by the photodetecting elements. The graphs of FIGS. 6A through 6C represent the magnitudes of the amplitudes of the spatial frequencies of the graphs of FIGS. 5A through 5C respectively.

The graph of FIG. 5A shows the ideal representation of image data I(P) of a single point of light that would be generated by a two-dimensional photosensor array without a blur filter associated therewith. As shown in FIG. 5A, a single photodetecting element, eight or spatial location eight, generates image data having a magnitude of eight. The graph of FIG. 5B is a representation of image data I(P) of the single point of light of FIG. 5A that would be generated by a two-dimensional photosensor array having a blur filter of two pixels associated therewith. As shown in FIGS. 5A and 5B, the blur filter causes the image data I(P) to have a reduced high spatial frequency content, which is evident by the discrete pulse of the graph of FIG. 5A versus the discrete triangular function of the graph of FIG. 5B. In the graph of FIG. 5B, the magnitude of the spatial location eight drops to an amplitude of four and the magnitudes of spatial locations seven and nine increase from zero to two. It should be noted that the graph of FIG. 5B is considered the "perfect" point of light as imaged by the camera with the two pixels of blur. As the number of photodetecting elements in a digital camera increases, this "perfect" image represented by the graph of FIG. 5B more closely resembles the point of light of FIG. 5A. Accordingly, the negative affects of the blur filter become insignificant.

It should be noted that many digital cameras have various types of blur filters, such as a blurry lens, a birefringent filter or lens, or other blur filter device. The blur filter is to prevent objectionable aliased signal artifacts in the image. Aliased signal artifacts are typically associated with large areas of moderately high spatial frequency repetitive patters, such as the weave of a shirt.

The graph of FIG. 5C shows the amplitude of image data received by a camera having a blur filter associated therewith and undergoing motion equivalent to two and one-half pixels or photodetecting elements as image data is being generated. As shown in FIG. 5C, the energy from a single point of light (FIG. 5A) is spread over a total of five photodetecting elements due to the blur filter and the motion blur. In the non-limiting example of FIG. 5C, the amplitude of image data generated at the sixth and tenth spatial locations has increased to 0.6. The amplitude of image data generated at the seventh and ninth spatial locations have decreased of two. The amplitude of image data generated at the eighth spatial location has decreased to 2.8. As shown by the graph of FIG. 5C, the image data generated with respect to the spatial locations represents a very wide triangular function. This is indicative of a very low magnitude of high spatial frequency content of the replicated image, meaning that the replicated image is not sharp and is likely blurred.

As will be described in greater detail below, motion blur in the replicated image is reduced by increasing the magnitude of the amplitude of the sinusoidal signals at specific spatial frequencies of the frequency domain transformed image in the direction of the motion blur. It should be noted that the sinusoidal signals are used herein for illustration purposes and that they are derived by way of a Fourier transform. It should also be noted that the inventive concepts described herein are applicable to other signals derived from other transform functions.

Different sharpening kernels may be applied to the image data in the direction of the motion blur to increase the magnitude of the amplitude of the high spatial frequency content. In one non-limiting example, a Weiner correction algorithm is applied to the frequency domain transformed image data in the direction of the motion blur to increase the magnitude of the amplitude of a specific set of spatial frequency content. It should be noted that other correction algorithms may be applied to the image data to reduce motion blur.

Having summarily described the effects of motion blur and a method of minimizing the effects of motion blur, the detection of motion blur will now be described.

As summarily described above, motion blur due to translational motion, unlike other blurs, only occurs in a single direction. For example, with reference to the motion blur illustrated by the images 156 and 158 of FIG. 2, the motion blur only occurs in the x-direction X. Other blurs, such as optical blur, typically occur in all directions. Accordingly, the magnitude of the amplitude of the high spatial frequency content of an image affected by motion blur will be low in the direction corresponding to the direction of the motion. The magnitude of the amplitude of the high spatial frequency content corresponding to directions perpendicular or substantially perpendicular to the direction of motion will be less. When applied in practice, the magnitude of the amplitude of the high spatial frequency content in the direction of the motion blur will be significantly lower than the magnitude of the amplitude of the same specific high spatial frequency content in a perpendicular direction.

The detection of motion blur may be accomplished by analyzing image data generated by photodetecting elements 138 located in a portion of the two-dimensional photosensor array 130. A user of a camera typically assures that the subject of the photograph is focused and substantially centered in the photograph. Accordingly, the center of the photograph is where the sharpest focused image is located. For this reason, in the examples described herein, image data generated by a central portion of the two-dimensional photosensor array 130 will be analyzed for motion blur. For example, image data generated by the middle one-ninth of the two-dimensional photosensor array 130 may be analyzed for motion blur. It should be understood, however, that any portion of the two-dimensional photosensor array 130 may be analyzed for motion blur.

Figure 7:
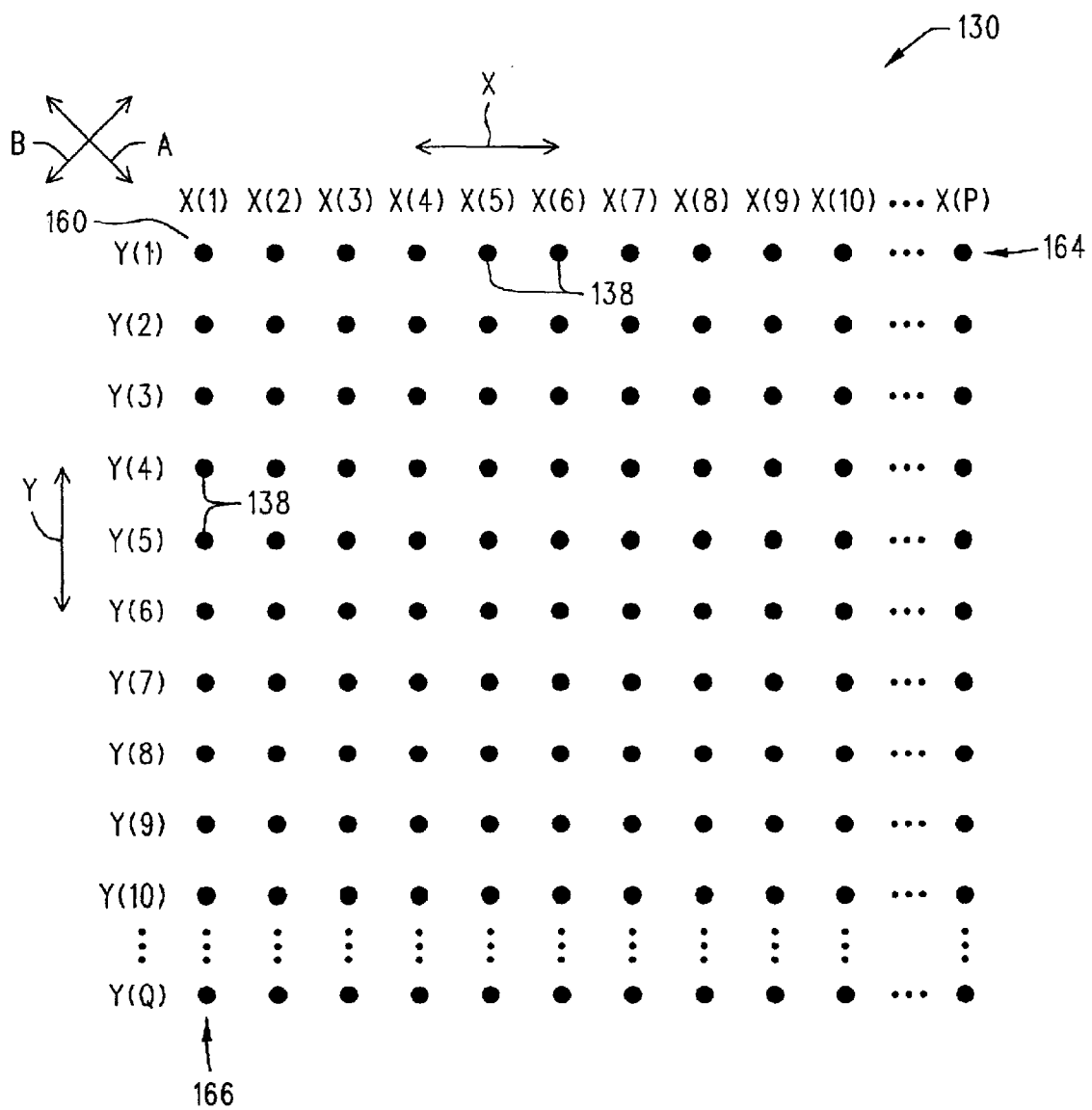
FIG. 7 is an enlarged view of photodetecting elements located on the surface of the two-dimensional photosensor array of FIG. 2.

For illustration purposes, an example of analyzing image data to determine the direction and magnitude of motion blur is provided. The analysis commences analyzing image data generated by the photodetecting elements 138 located in the vicinity of a corner 160 of the image 156. FIG. 7 is an exploded view of the photodetecting elements 138 located in the corner 160 of the two-dimensional photosensor array 130. Image data generated by a row 164 of photodetecting elements 138 extending in the x-direction X will be analyzed in the following example. Likewise, image data generated by a column 166 of photodetecting elements 138 extending in the y-direction Y will also be analyzed in the following example. The photodetecting elements 138 in the row 164 are referenced as X(1), Y(1) through X(10), Y(1) and the photodetecting elements 138 in the column 166 are referenced as X(1), Y(1) through X(1), Y(10). It should be noted that for illustration purposes, only ten photodetecting elements 138 extending in the x-direction X and the y-direction Y are being analyzed. It is to be understood, however, that any number of photodetecting elements 138 in the x-direction X and the y-direction Y may be analyzed. It is also to be further understood that any number of photodetecting elements 138 extending in the a-direction A and the b-direction B may also be analyzed to detect motion blur in other directions.

The first step in determining whether motion blur exists in the image data is to analyze the magnitude of the amplitude of the high spatial frequency content in orthogonal directions over an area of an image. The magnitude of the amplitude of the high spatial frequency content in the x-direction X and the y-direction Y is proportional to the figure of merit in the x-direction X and the y-direction Y respectively. The figure of merit provides a basis for determining the degree to which light/dark transitions occur in a specific direction in an image. A non-limiting example of a figure of merit in the x-direction X is referred to herein as $F_x$ and is calculated as follows:

$$F_x = \sum_{m=1}^{m=q} \sum_{n=1}^{n=p} |X(n, m) - X(n-1, m)|$$

wherein p is the number of photodetecting elements 138 in the x-direction X that are to be analyzed, q is the number of rows that are analyzed in the x-direction X, and X(n,m) is the value of the image data generated by the photodetecting element 138 at that location. Accordingly, n designates the column number of the photodetector array and m designates the row number. It should be noted that in the non-limiting example described herein, the figure of merit $F_x$ may calculated in the center of the image where the sharpest focus occurs. It should also be noted that the figures of merit are calculated in a single color plane and not by adjacent photodetecting elements for the example of the digital camera described herein. This assures that the figure of merit measures motion blur and not color transitions in the image. Furthermore, by not analyzing adjacent photodetecting elements, the anti-aliasing blur filter will have little, if any, influence on the figure of merit calculation. It should be noted that virtually any increment of pixel values may be used to calculate the figure of merit. A preferred embodiment will use photodetecting elements that are close together within one color plane, because this will emphasize the higher spatial frequencies. The higher spatial frequencies are the most sensitive measures of motion blur. It should also be noted that the figures of merit may be calculated in any direction to measure motion blur in any direction.

As with the figure of merit in the x-direction X, the figure of merit in the y-direction Y is referred to as $F_y$ and is calculated as follows:

$$F_Y = \sum_{n=1}^{n=p} \sum_{m=1}^{m=q} |Y(n, m) - Y(n, m-1)|$$

wherein q is the number of photodetecting elements 138 in the y-direction Y that are to be analyzed, p is the number of columns in the y-direction Y, and Y(n.m) is the value of the image data generated by the photodetecting element 138 at that location. It should be noted that in the non-limiting example described herein, the figure of merit $F_y$ is calculated along the column 166. In one preferred embodiment, p is equal to q so that the figures of merit are calculated from a square section of the image.

As described above, the figures of merits described herein are non-limiting examples of figures of merit. Other variations of the figure of merit can use weighted multiple color planes. For example, the figures of merit may be calculated in all the color planes. The values from the different color planes can be weighted and summed together. For example, each green plane may be weighted thirty percent, the red plane may be weighted thirty percent and the blue plane may be weighted ten percent. Likewise, the spatial frequencies may be weighted. It is also possible to combine weighted color planes with weighted spatial frequencies. In another variation, higher order numerical methods may be used to generate the slope estimates. These slope estimate may be used rather than the simple difference calculations described above.

The figures of merit provide indications of the magnitudes of the amplitudes of spatial frequencies of the image in the specified directions. Referring briefly to FIG. 5A, the graph shows a steep transition between adjacent photodetecting elements for image data generated without motion blur and without a blur filter. More precisely, the single point of light has caused image data to be generated solely at the eighth spatial position. Accordingly, the figure of merit associated with the graph of FIG. 5A is high. The graph of FIG. 5B shows transitions between image data values that are not as steep as the graph of FIG. 5A. Accordingly, the figure of merit associated with the graph of FIG. 5B is less that the figure of merit associated with the graph of FIG. 5A. The graph of FIG. 5C shows image data generated in the presence of motion blur. The motion blur decreases the magnitudes of the transitions between image data values of adjacent photodetecting elements 138, FIG. 2. Accordingly, the figure of merit of the image data associated with the graph of FIG. 5C is less than the figures of merit associated with the graphs of FIG. 5A and FIG. 5B. It should also be noted that the figure of merit as described herein is proportional to the magnitude of the slope of the graphs. By using the figure of merit equations described above, the figures of merit for the graphs of FIGS. 5A is sixteen, the figure of merit of the graph of FIG. 5B is eight, and the figure of merit of the graph of FIG. 5C is 5.6.

As described above, motion blur due to translational motion, unlike other blurs, occurs only in one direction. Accordingly, if the figure of merit in the x-direction X, $F_x$, differs from the figure of merit in the y-direction Y, $F_y$, motion blur likely occurred during the generation of the image data. This difference in the figures of merit may be calculated by taking the ratio of $F_x$ to $F_y$ or $F_y$ to $F_x$ and comparing the ratio to a preselected value. As a non-limiting example, if the ratio is greater than 1.4, it can be assumed that motion blur occurred. It follows that the direction of the motion blur will be in the direction having the lower figure of merit because the magnitudes of the transitions in this direction are lower. It also follows that the value of the ratio determines the amount of motion blur. For example, a greater value of the ratio means that the image was blurred over a greater number of photodetecting elements 138, FIG. 2. The value of the ratio is used to determine the amount to which motion blur is to be minimized. It should be noted that the non-limiting methods described herein for determining the direction of motion blur determine the direction of motion blur closest to a preselected direction. For example, the methods described herein may determine the direction of motion blur that is closest to the x-direction X, the y-direction Y, the a-direction A or the b-direction B. Similar methods can be used to expand the possible number of directions in which motion blur may be analyzed.

When a determination has been made that the image has been blurred or, more specifically, that the replicated image is blurred, the image data is processed to minimize the blur of the replicated image. Minimizing motion blur involves increasing the magnitude of the amplitude of sinusoidal signals at specific spatial frequencies of the frequency domain transformed image data in the direction of the blur. A non-limiting example may be achieved by amplifying image data values corresponding to higher spatial frequencies. For example, in the case where the motion blur occurs in the x-direction X, the image data generated by individual rows 140, FIG. 2, of photodetecting elements 138 are processed to increase the magnitude of the amplitude of spatial frequency. Other scaling and processing techniques as described below may also be applied to the image data.

It should be noted that the effects of motion blur occur to all the color planes equally. Therefore, image data from one color plane may be analyzed to determine the direction and amount of motion blur. The magnitude of the amplitude of sinusoidal signals at specific spatial frequencies of the frequency domain transformed image of the color planes may be increased equally in order to minimize the affects of motion blur on the whole composite image. It should be further noted that processing the image data to minimize the motion blur may be performed during the process of demosaicing the image data as disclosed in the United States patent application of Taubman, previously referenced. This may, as an example, involve scaling demosaicing coefficients in the direction of the motion blur to increase the magnitude of the amplitude of sinusoidal signals at specific spatial frequencies of the frequency domain transformed image in the direction of the motion blur. Other techniques can be used to reduce motion blur, such as directional sharpening kernels, windowed directional sharpening kernels, and directional deconvolution correction.

The procedure described above determines the amount and direction of motion blur. It should be noted that the procedure described above is applicable for detecting and minimizing motion blur along any orthogonal directions. For illustration purposes, an example of detecting and minimizing motion blur in additional directions diagonal to the x-direction X and the y-direction Y is provided. The diagonal directions are referenced in FIG. 3 as the a-direction A and the b-direction B, which are perpendicular to each other. In this situation, the figures of merit are calculated in the a-direction A and the b-direction B along with the ratio of the figures of merit as described above with reference to the x-direction X and the y-direction Y. At this point, two ratios exist, one for figures of merit in the x and y-directions X and Y and one for figures of merit in the a and b-directions A and B. The ratio having the greatest value indicates the orthogonal directions associated with the motion blur. The actual direction of the motion blur is determined by the lowest figure of merit associated with the ratio having the greatest value. Motion blur in this direction is minimized in the manner described herein by increasing the magnitude of the amplitude of the magnitude of sinusoidal signals at specific spatial frequencies of the frequency domain transformed image in this direction.

Having described the method for determining whether motion blur is present in an image and a method of minimizing the motion blur, a detailed example of reducing motion blur is now provided.

The following example is based on the imaged point of light of FIGS. 5A through 5C. As described above, the point of light without the use of a blur filter appears solely at the eighth spatial position and generates image data having a magnitude of eight. The point of light imaged by a camera having a two-pixel blur filter and undergoing motion blur of two and one half pixels generates image data as described above with reference to the graph of FIG. 5C. The values of spatial frequency of the graph of FIG. 5C are significantly less that the values of spatial frequency of the graph of FIG. 5A. For reference purposes, the values of the spatial frequencies of the graphs of FIGS. 5A through 5C are shown in the bar graphs of FIGS. 6A through 6C. It should be noted that the graphs of FIGS. 6A through 6C do not include phase information. As shown by the graph of FIG. 6A, the single point of light of FIG. 5A has a normalized amplitude of one across the frequency spectrum, similar to an impulse function. The graph of FIG. 6B shows the decreased spatial frequency values due to the blur filter added to the camera. FIG. 6C shows that the values of spatial frequency are even more decreased by motion blur. The values of the spatial frequencies due to the blur filter and motion blur are detailed in Table 1. It should be noted that in the spatial frequency eight is the highest and spatial frequencies zero and fifteen are the lowest.

TABLE 1

| Spatial Frequency | Ideal Point of light | Blur Filter Amplitude (perfect image) | Motion Blur Amplitude w/Blur Filter | Weiner Correction Factor | Weiner Corrected Amplitude |
|---|---|---|---|---|---|
| 0 | 1 | 1 | 1 | 1 | 1 |
| 1 | 1 | .96 | .92 | 1.04 | .957 |
| 2 | 1 | .85 | .7 | 1.172 | .82 |
| 3 | 1 | .69 | .44 | 1.418 | .623 |
| 4 | 1 | .5 | .2 | 1.9 | .38 |
| 5 | 1 | .31 | .05 | 1.944 | .097 |
| 6 | 1 | .15 | .004 | 1.366 | .005 |
| 7 | 1 | .04 | .006 | .578 | .003 |
| 8 | 1 | 0 | 0 | 0 | 0 |
| 9 | 1 | .04 | .006 | .578 | .003 |
| 10 | 1 | .15 | .004 | 1.366 | .005 |
| 11 | 1 | .31 | .05 | 1.944 | .097 |
| 12 | 1 | .5 | .2 | 1.9 | .38 |
| 13 | 1 | .69 | .44 | 1.418 | .623 |
| 14 | 1 | .85 | .7 | 1.172 | .82 |
| 15 | 1 | .96 | .92 | 1.04 | .957 |

As shown by the data of Table 1, motion blur attenuated the high spatial frequency content of the transformed image. More specifically, the values of the high spatial frequencies of five, six, seven, and eight are attenuated. Motion blur did not attenuate the values of the lower spatial frequencies.

Various image sharpening kernels can be applied to the image data in the direction of the motion blur in order to increase the magnitude of the amplitude of the high spatial frequency content. The result of the increased amplitude of the high spatial frequency content is a sharper image, which is a reduction of the blur caused by motion. More specifically, the transitions between light and dark areas are accentuated.

Table 1 shows the Weiner correction factor that is applied to the signal at the specific spatial frequencies in the direction of the motion blur so as to reduce motion blur. It should be noted that the Weiner correction factor used herein has a minimal impact on the high spatial frequency content. As shown in Table 1, the frequencies seven and eight are minimally impacted by the Weiner correction factor applied herein. This is because the very high spatial frequency content of the image data tends to include a lot of noise. Thus, if the very high spatial frequency content is amplified, the noise will likely be amplified more than the signal.

Figure 8:
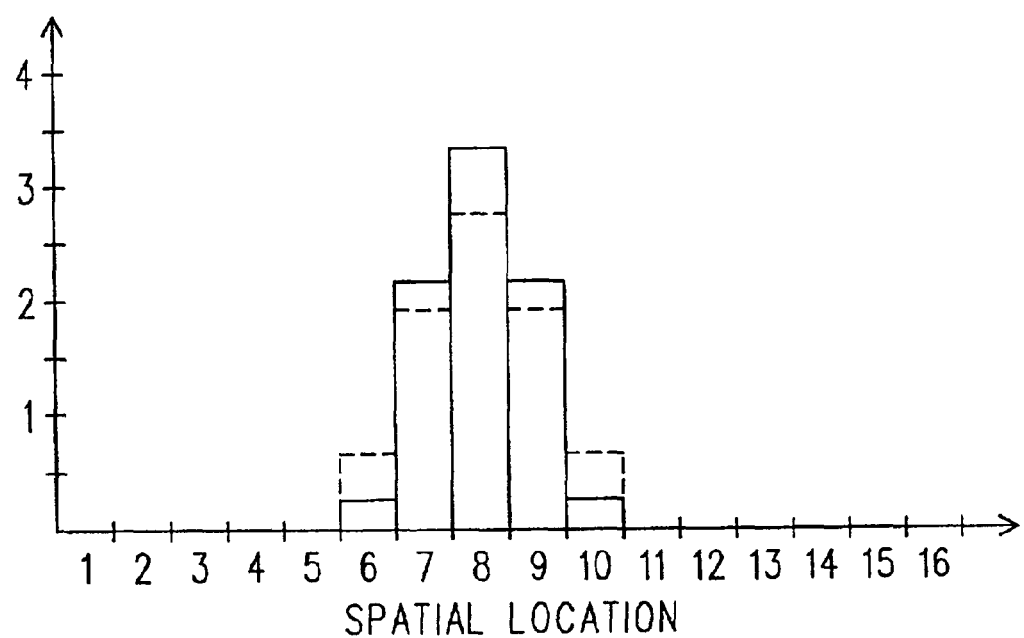
FIG. 8 is a graph showing the representation of FIG. 5C with motion blur minimized.

The resulting image after the application of the Weiner correction factor is shown in FIG. 8, which is a graph of the point of light of FIG. 5C imaged under a motion blur condition, but with the Weiner correction factor applied. The original motion blurred image of FIG. 5C is shown in dashed lines in FIG. 8 for reference purposes. The values of the blurred image of FIG. 5C are compared to the values of the corrected image of FIG. 8 in Table 2 under the portion titled Weiner Corrected Image. It should be noted that the Weiner corrected image factor corrected the image for two pixels or photodetecting elements 138, FIG. 2, of motion blur. The Weiner correction algorithm may be modified to correct for any number of pixels of motion blur.

TABLE 2

| Spatial Location | Point of Light | Blur Filter | Motion Blurred Image | Weiner Corrected Image | −1, 3, −1 Sharpening Kernel | −0.5, 2, −0.5 Sharpening Kernel |
|---|---|---|---|---|---|---|
| 1 | 0 | 0 | 0 | 0.03 | 0 | 0 |
| 2 | 0 | 0 | 0 | 0 | 0 | 0 |
| 3 | 0 | 0 | 0 | −0.04 | 0 | 0 |
| 4 | 0 | 0 | 0 | 0.02 | 0 | 0 |
| 5 | 0 | 0 | 0 | 0.06 | 0 | 0 |
| 6 | 0 | 0 | 0 | −0.20 | −0.60 | −0.30 |
| 7 | 0 | 0 | 0.60 | 0.28 | −0.20 | 0.20 |
| 8 | 0 | 2 | 2.00 | 2.17 | 2.60 | 2.30 |
| 9 | 8 | 4 | 2.80 | 3.37 | 4.40 | 3.60 |
| 10 | 0 | 2 | 2.00 | 2.17 | 2.60 | 2.30 |
| 11 | 0 | 0 | 0.60 | 0.28 | −.020 | 0.20 |
| 12 | 0 | 0 | 0 | −0.20 | −0.60 | −0.30 |
| 13 | 0 | 0 | 0 | 0.60 | 0 | 0 |
| 14 | 0 | 0 | 0 | 0.02 | 0 | 0 |
| 15 | 0 | 0 | 0 | −0.04 | 0 | 0 |

As illustrated by Table 2, the Weiner corrected image restores the image to a close approximation to the image represented by the blur filter column. It should be noted that the value of the highest amplitude at the spatial location nine ideally would be restored to a value of four, however, the Weiner correction factor as described herein restored it to a value of 3.37 from its motion blurred value of 2.8. It should also be noted that the Weiner correction factor illustrated herein has very few negative numbers, which have very small magnitudes. High magnitude negative numbers tend to increase the Gibbs effect, which is detrimental to image quality. The −1, 3, −1 sharpening kernel did increase the value of the highest spatial frequency. However, the value of 4.4 is much greater than the ideal value of 4.0, which increases the noise and is actually detrimental to the image quality.

As described above, different sharpening algorithms can be applied to the image data in the direction of the motion blur in order to reduce the motion blur. In Table 2, two alternative examples of sharpening algorithms or kernels are provided. More specifically, the results of a −1, 3, −1 and a −0.5, 2, −0.5 sharpening kernels are shown in Table 2.

Having described an embodiment of the motion blur detection and minimization methods, other embodiments will now be described.

The method described herein corrects for two pixels of motion blur. It is to be understood, however, that the method may be modified to correct for different amounts of motion blur. In one embodiment, a determination is made as to the amount of motion blur in the image. The image is then 'deblurred' an amount based on the amount of blur in the image. For example, the method may be able to correct for two or four pixels of motion blur. If the image is determined to have greater than one and less than three pixels of motion blur, the image may be corrected for two pixels of motion blur. If the image is determined to have three to five pixels of motion blur, the image is corrected for four pixels of motion blur.

The detection of motion blur has been described herein as being accomplished by analyzing image data representative of an object. Motion blur may also be detected by using a sensor or plurality of sensors mounted to the camera 100, FIG. 1, that detect the amount and direction of movement of the camera during the period in which image data is being generated. The direction and amount of motion blur then establish the coefficients for the image sharpening algorithms to reduce the motion blur.

Referring to FIG. 1, the detection and minimization of motion blur has been described herein as being performed by the processor 132 located within the camera 100. In another embodiment, the processor 132 may facilitate the transfer of image data to a peripheral processor that may detect and minimize motion blur. For example, a blurred photograph may be captured or otherwise scanned so as to generate image data representative of the object.

Referring again to FIG. 6, the figures of merit have been calculated based on image data that is generated by photodetecting elements 138, FIG. 2, that are located next to each other or next to each other in a given color plane. One embodiment of the above-described method bases the calculation of the figures of merit on image data that is generated by photodetecting elements 138 that are spaced a distance from each other. This will measure the figure of merit at a different spatial frequency. For example, the figures of merit may be calculated based on image data generated by every other or every third photodetecting element 138. This embodiment may be used in processing information from digital cameras having a great number of photodetecting elements 138. By not processing the image data generated by all the photodetecting elements 138, the time required to determine motion blur is decreased. Several figures of merit at several spatial frequencies can be combined using weighting factors to make the overall figure of merit calculation more immune to image or scene content. Additionally, several color planes may be weighted in a similar manner. Likewise, a combination of color planes and spatial frequencies may be weighted.

In another embodiment, small portions of the image are analyzed to determine if motion blur exists in a small portion of the image. The motion blur is then minimized in that small section. For example, the camera may be held stationary relative to a background as image data is being generated. An object being imaged, however, may be moving relative to the camera and the background as image data is being generated. The method described above, will reduce the motion blur of the image of the object without creating blur in the background.

The above described method of minimizing motion blur becomes more useful as the density of photodetecting elements located on a two-dimensional photosensor array increases. The purpose of having an increased density of photodetecting elements is to provide a more defined or sharper image. The susceptibility to motion blur, however, increases as the density of photodetecting elements increases. During the period that the photodetecting elements are generating image data, the image of the object is more likely to shift between photodetecting elements when the density of photodetecting elements is high. This shifting will be detected as motion blur and will be minimized accordingly.

The above described method of minimizing motion blur also becomes more useful in generating image data in relatively dark environments. The period required by the photodetecting elements to generate image data is proportional to the amount of light reflecting from the object being imaged. Accordingly, when imaging is performed in a relatively dark environment, the period required to generate the image data increases. This increased period increases the likelihood that the user of the camera will move the camera while image data is being generated, which will cause motion blur. By implementing the above-described procedure, the motion blur can be minimized.

Other embodiments for determining and minimizing motion blur may be employed using the methods described herein. In one embodiment, several color planes are analyzed to determine the motion blur. These include the green, red, and blue color planes. In another embodiment, more than four directions are analyzed for the presence of motion blur. For example, eight directions may be analyzed, which offers a more precise determination of the direction of motion blur. In yet another embodiment, the image data is analyzed to determine if different amounts of motion blur are present. For example, the image data may be analyzed to determine if no motion blur exists, two pixel motion blur exists, four pixel motion blur exists and so on.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for detecting motion blur in a digital image, said method comprising:
   providing image data representative of said digital image;
   analyzing said image data to calculate a first figure of merit of said digital image in a first direction;
   analyzing said image data to calculate a second figure of merit of said digital image in a second direction, said first and said second directions being substantially orthogonal;
   calculating a first ratio of said first figure of merit to said second figure of merit, said ratio being the greater of said first or second figure of merit divided by the lesser of said first or second figure of merit; and
   comparing said first ratio to a preselected value, wherein motion blur exists in said digital image if said first ratio is greater than said preselected value.

2. The method of claim 1, wherein said providing image data providing a plurality of data values corresponding to a plurality of pixels representing said digital image.

3. The method of claim 2, wherein said calculating a figure of merit comprises calculating the summation of the absolute values of the differences of data values corresponding to adjacent pixels along an axis.

4. The method of claim 2, wherein said calculating a figure of merit comprises calculating the summation of the absolute values of the differences of data values corresponding to pixels spaced a preselected distance from each other along an axis.

5. The method of claim 1, wherein said providing image data comprises providing image data corresponding to a preselected color component of said digital image.

6. The method of claim 1 and further comprising:
   analyzing said image data to calculate a third figure of merit of said digital image in a third direction, said third direction being diagonal to said first direction and said second direction;
   analyzing said image data to calculate a fourth figure of merit of said digital image in a fourth direction, said third and said fourth directions being substantially orthogonal;
   calculating a second ratio of said third figure of merit to said fourth figure of merit, said second ratio being the greater of said third or fourth figure of merit divided by the lesser of said third or fourth figure of merit; and
   comparing said second ratio to a preselected value to determine if motion blur is present in said digital image.

7. The method of claim 8, and further comprising comparing said first ratio to said second ratio to determine the direction of motion blur, wherein said direction of motion blur exists in the direction corresponding to the lowest value of a figure of merit from the greater of said first ratio or said second ratio.

8. The method of claim 1 and further comprising reducing motion blur by increasing the magnitude of the edge acuity of said image data in the direction of motion blur if motion blur exists.

9. The method of claim 1, and further comprising reducing motion blur by increasing the magnitude of the amplitude of spatial frequencies of said image data in the direction of motion blur if motion blur exists.

10. The method of claim 1, and further comprising reducing motion blur by increasing the magnitude of the amplitude of preselected spatial frequencies in said image data in the direction of motion blur if motion blur exits.

11. The method of claim 1, and further comprising reducing motion blur by increasing the magnitude of the amplitude of the sinusoidal signals in a preselected set of spatial frequencies of the image in the direction of the motion blur.

12. The method of claim 1, wherein said providing image data comprises providing image data representative of a portion of said image.

13. A method for detecting motion blur in a digital image, said method comprising:
   providing image data representative of said digital image;
   analyzing said image data to calculate a plurality of first figures of merit of said digital image in a plurality of directions;
   analyzing said image data to calculate a plurality of second figures of merit of said digital image, wherein each of said second figures of merit is in a direction substantially orthogonal to a corresponding first figure of merit;
   calculating a plurality of ratios of said first figures of merit to their corresponding second figures of merit, each of said ratios being the greater of a first or second figure of merit divided by the lesser of its corresponding first or second figure of merit; and
   comparing said ratios to a preselected value, wherein motion blur exists in said digital image if one of said ratios is greater than said preselected value.

14. A method for reducing motion blur in an image, said method comprising:
   providing image data representative of said image;
   analyzing said image data to detect the presence of motion blur in said image; wherein analyzing said image data comprises calculating a first figure of merit of said image in a first direction;
   analyzing said image data comprises calculating a second figure of merit of said image in a second direction, said first and said second directions being substantially orthogonal;
   calculating a first ratio of said first figure of merit to said second figure of merit, said first ratio being the greater of said first or said second figure of merit divided by the lesser of said first or said second figure of merit; and
   comparing said first ratio to a preselected value, wherein motion blur exists in said image if said first ratio is greater than said preselected value; and
   processing said image data to increase edge acuity of said image in said direction of said motion blur.

15. The method of claim 14, wherein said analyzing said image data to detect the direction of motion blur comprises determining the lowest value of said first and said second figures of merit, said lowest value corresponding to said direction of motion blur.

16. The method of claim 14, wherein said analyzing said image data to detect the presence of motion blur comprises:

analyzing said image data to calculate a plurality of first figures of merit of said digital image in a plurality of directions;

analyzing said image data to calculate a plurality of second figures of merit of said digital image, wherein each of said second figures of merit is in a direction substantially orthogonal to a corresponding first figure of merit;

calculating a plurality of ratios of said first figures of merit to their corresponding second figures of merit, each of said ratios being the greater of a first or second figure of merit divided by the lesser of its corresponding first or second figure of merit; and comparing said ratios to a preselected value, wherein motion blur exists in said digital image if one of said ratios is greater than said preselected value.

17. The method of claim 16, wherein said analyzing said image data to detect the direction of motion blur comprises determining which of said ratios has the highest value and determining the lowest figure of merit of said highest valued ratio, said lowest figure of merit corresponding to said direction of motion blur.

18. The method of claim 14, wherein said providing image data comprises providing image data representative of a portion of said image.

19. The method of claim 14, wherein said processing comprises increasing the magnitude of the amplitude of the signals in a preselected set of spatial frequencies of the transformed image data in the direction of the motion blur.

20. The method of claim 14, wherein said processing comprises increasing the magnitude of the amplitude of the sinusoidal signals in a preselected set of spatial frequencies of the transformed image data in the direction of the motion blur, wherein said image data is transformed by a Fourier transform.

21. The method of claim 20, and further comprising transforming said image data back to the spatial domain by an inverse Fourier transform.

22. The method of claim 14, wherein said processing comprises increasing the amplitude of signals of said image based on the detection and amplitude of motion blur.

23. An apparatus for detecting motion blur in an image, said apparatus comprising a computer and a computer-readable medium operatively associated with said computer, said computer-readable medium containing instructions for controlling said computer to detecting motion blur in an image by:

receiving image data representative of said image;

calculating a first figure of merit of said image data in a first direction;

calculating a second figure of merit of said image data in a second direction, said first and said second directions being substantially orthogonal;

calculating a first ratio of said first figure of merit to said second figure of merit, said ratio being the greater of said first or said second figure of merit divided by the lesser of said first or said second figure of merit; and comparing said first ratio to a preselected value, wherein motion blur exists in said digital image if said first ratio is greater than said preselected value and motion blur exists in the direction corresponding to the lesser of said figures of merit.

24. A device for detecting motion blur in a digital image, said device comprising:

means for analyzing image data representative of said digital image to calculate a first figure of merit of said digital image in a first direction;

means for analyzing said image data to calculate a second figure of merit of said digital image in a second direction, said first and said second directions being substantially orthogonal;

means for calculating a first ratio of said first figure of merit to said second figure of merit, said ratio being the greater of said first or second figure of merit divided by the lesser of said first or second figure of merit; and means for comparing said first ratio to a preselected value, wherein motion blur exists in said digital image if said first ratio is greater than said preselected value.

* * * * *

UNITED STATES PATENT AND TRADEMARK OFFICE
CERTIFICATE OF CORRECTION

PATENT NO. : 6,987,530 B2  
APPLICATION NO. : 09/867352  
DATED : January 17, 2006  
INVENTOR(S) : Charles H McConica Page 1 of 1

It is certified that error appears in the above-identified patent and that said Letters Patent is hereby corrected as shown below:

In column 17, line 38, in Claim 2, before "providing" insert -- comprises --.

In column 18, line 1, in Claim 7, delete "claim 8" and insert -- claim 6 --, therefor.

In column 18, line 18, in Claim 10, delete "exits" and insert -- exists --, therefor.

Signed and Sealed this

Twenty-third Day of June, 2009

JOHN DOLL  
*Acting Director of the United States Patent and Trademark Office*